United States Patent [19]

Komatsu et al.

[11] Patent Number: 4,584,004

[45] Date of Patent: Apr. 22, 1986

[54] DUST COLLECTOR

[75] Inventors: Fumiaki Komatsu; Seiichi Hirano, both of Kobe; Hiromi Tanabe, Hyogo, all of Japan

[73] Assignee: Kabushiki Kaisha Kobe Seiko Sho, Kobe, Japan

[21] Appl. No.: 536,723

[22] Filed: Sep. 28, 1983

[30] Foreign Application Priority Data

Sep. 28, 1982 [JP] Japan ............................. 57-170199

[51] Int. Cl.$^4$ ............................................. B01D 46/00
[52] U.S. Cl. ........................................ 55/422; 55/430; 55/478; 55/506; 55/DIG. 9
[58] Field of Search ............... 55/430, 422, 478, 480, 55/481, 506, DIG. 9, 356

[56] References Cited

U.S. PATENT DOCUMENTS

| 4,334,896 | 6/1982 | Müller | 55/478 |
| 4,401,445 | 8/1983 | Browning | 55/96 |
| 4,459,140 | 7/1984 | Kuban et al. | 55/481 |

Primary Examiner—David L. Lacey
Attorney, Agent, or Firm—Oblon, Fisher, Spivak, McClelland & Maier

[57] ABSTRACT

A dust collector for radioactive particles includes a housing divided into upper and lower chambers by a partition plate, the upper chamber being formed with a discharge port for cleaned gas and a filter supply port, the lower chamber being formed with an inlet port for a gas to be cleaned and a filter discharge port, a filter holder extending through the partition plate, the filter holder being arranged to enable a filter to be installed from above and to be withdrawn downwardly.

8 Claims, 18 Drawing Figures

FIGURE 1

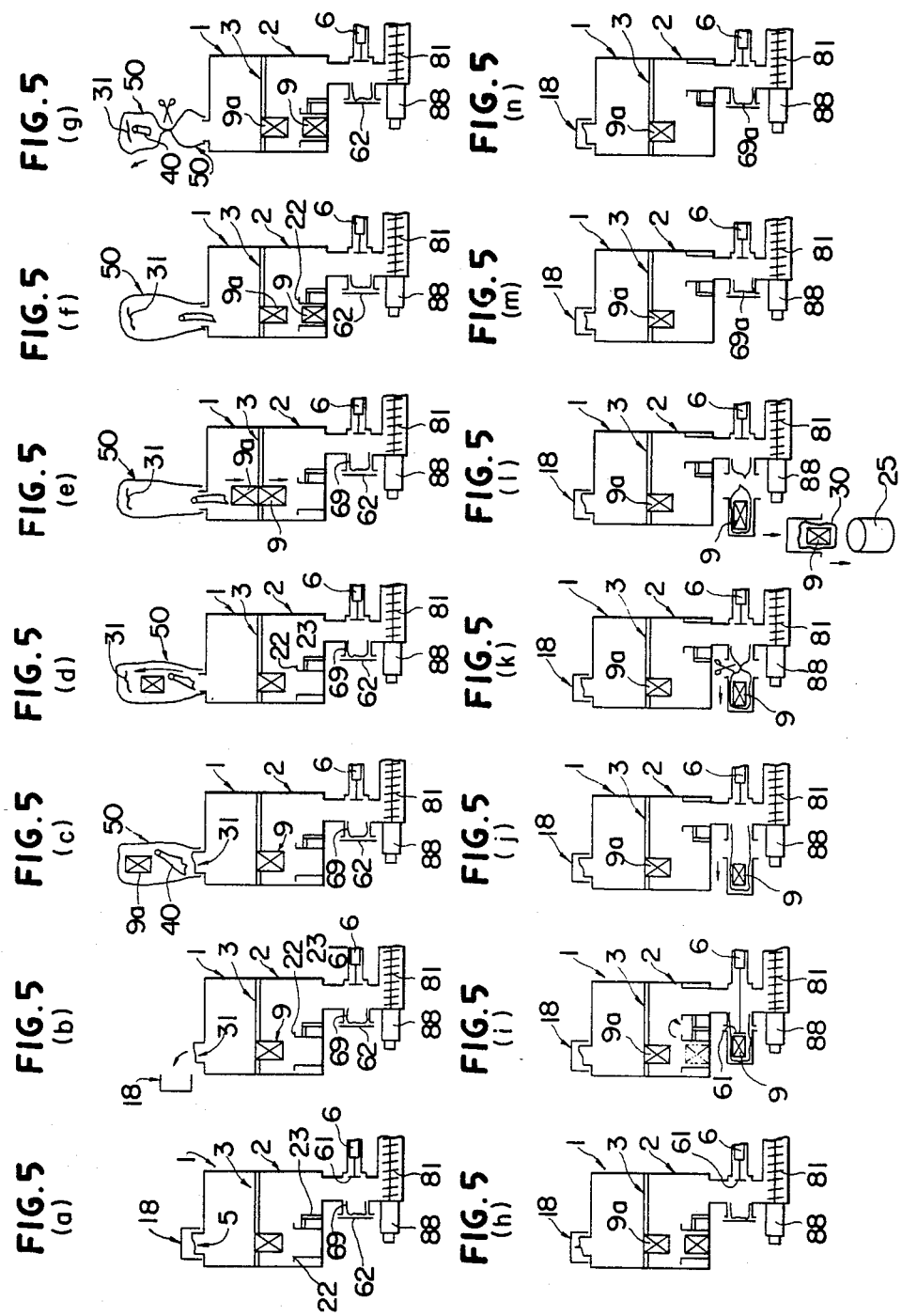

DUST COLLECTOR

BACKGROUND OF THE INVENTION

1. Field of the Invention

This invention relates to a dust collector for radioactive particles and other dust particles in general.

2. Description of the Prior Art

Facilities handling radioactive materials are often provided with equipment for handling powder particles having radioactive materials mixed therein, where negative pressure control is performed by employing a suction system using a blower or the like to maintain a negative pressure in the system inside the equipment. With such negative pressure control performed, it is a matter of course that powder particles containing radioactive materials are carried by the air current. In the case where a thermal means such as melting or sintering is employed for volume reduction and compaction of noncombustible powder particles such as incineration ashes containing radioactive materials, there collect in large quantites in the off-gas system the incineration ashes themselves or gases and a thermal decomposition product called a fume, so that it becomes necessary to remove these substances.

Generally, under said negative pressure control, for cleaning the exhaust air current and removing these powder particles, use is made of a high efficiency performance filter called the HEPA filter. The HEPA filter, though high in performamce, is liable to be clogged with collected powder particles and is used primarily on a throwaway basis. Thus, an economical arrangement would be to dispose a filter of large collection capacity at the stage preceding the HEPA filter. It would be thought to use a bag filter as this pre-stage filter, but generally a bag filter has a small filtration area, so that a large bag filter must be used. This increases the danger of radioactive powder particles flying away and makes exchange operation difficult.

Further, in collecting general air-borne dust, if the amount of dust is large it is desirable to continuously discharge collected dust separately from the step of removal of the filter. In that case, it is desirable that exchange of filters be made in a sealed space.

SUMMARY OF THE INVENTION

This invention has benn accomplished to solve these problems and provides a dust collector capable of preventing dust from flying away, facilitating exchange of filters, and continuously discharging dust.

More particularly, this invention provides an arrangement comprising a housing separated into upper and lower chambers by a partition plate, said upper chamber being formed with a gas discharge port and a filter supply port, said lower chamber being formed with an inlet port for a gas to be cleaned and a filter discharge port, a filter holder adapted to install a filter from above and withdraw it downwardly, and a filter discharge poprt formed below the lower chamber.

BRIEF DESCRIPTION OF THE DRAWINGS

Various other objects, features and attendant advantages of the present invention will be more fully appreciated as the same becomes better understood from the following detailed description when comsidered in connection with the accompanying drawings in which loke reference characters designate like or corresponding parts throughout the several views and wherein:

FIG. 1 is a vertical sectional view showing an embodiment of this invention;

FIGS. 5(a) through (n) shows the steps utilized in exchanging filters.

DETAILED DESCRIPTION OF THE PREFERRED EMBODIMENT

Figure 1:
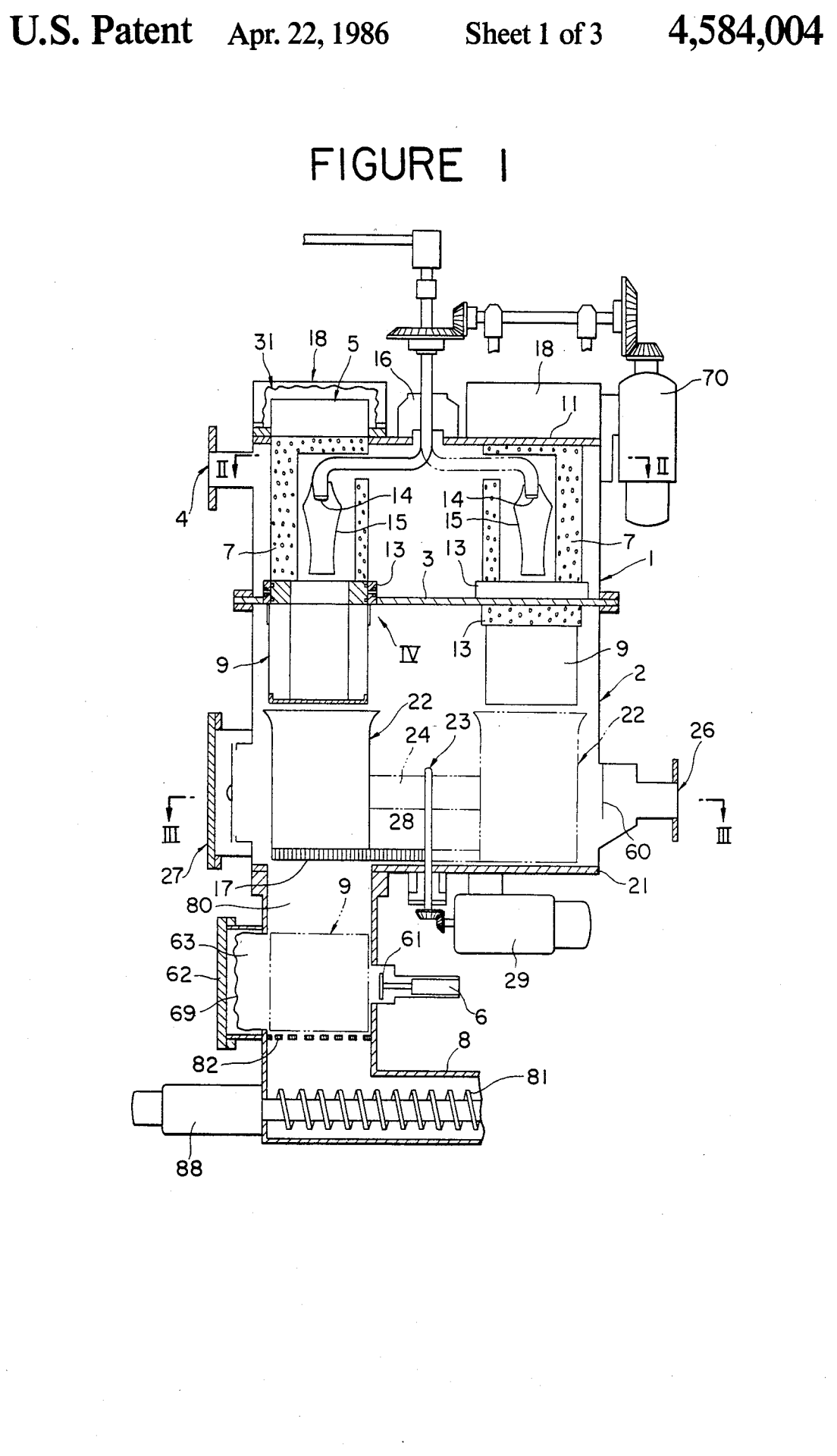
Figure 3:
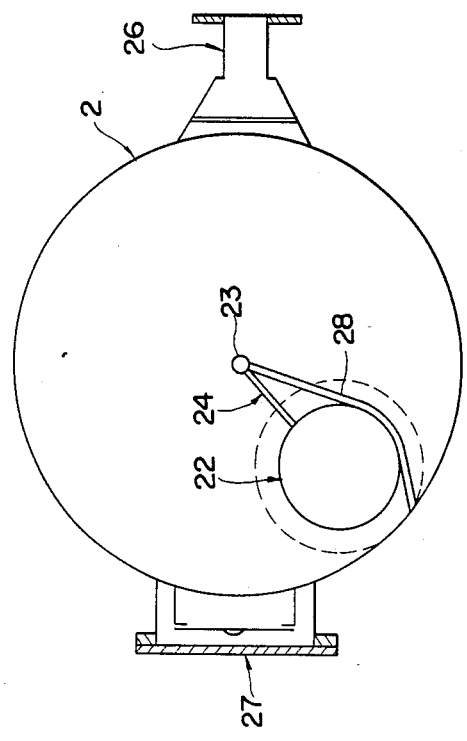
FIGS. 2 and 3 are sectional views taken along the lines II—II and III—III in FIG. 1, respectively.
Figure 4:
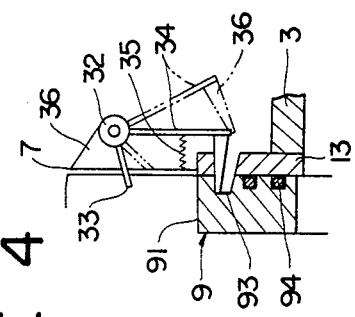
FIG. 4 is an enlarged view of a portion of FIG. 1 indicated by IV.
Figure 2:
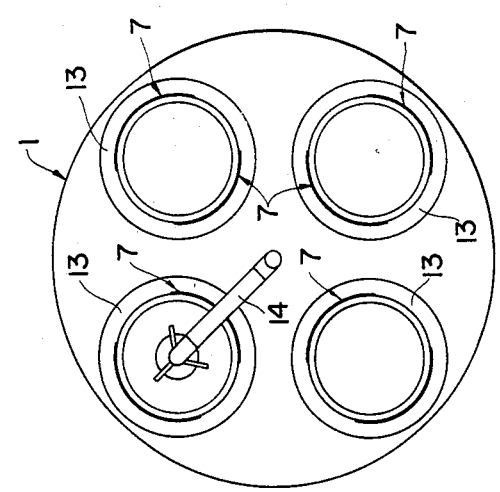

An embodiment of this invention will now be described with reference to the drawings. In FIGS. 1 through 4, the housing of the apparatus is composed of an upper chamber 1 and a lower chamber 2, the upper and lower chambers 1 and 2 being interconnected, with a partition plate 3, which divides the inner space and being disposed therebetween. The upper chamber 1 is formed with a discharge port 4 and a filter supply port 5, while the lower chamber 2 is formed with an inlet port 26 for a gas to be treated and a filter discharge port 17. The filter supply port 5 is sealed by a vinyl bag if a radioactive material is present. This vinyl bag is not ordinarily necessary, but even in ordinary cases if a poisonous material is treated, said bag may be installed according to need.

The partition plate 3 is formed with a holder 13 for a filter 9, and a cylindrical guide plate 7 is disposed between the holder and the filter supply port 5. The guide plate 7 perforated and notched to allow passage of a back-washing nozzle 14. In FIG. 1, such guide plates 7 and holders 13 are disposed, four each, in a circle. The nozzle 14 is rotatably supported in a bearing 16 installed on an upper plate 11 and is rotatively driven by a motor 70. The filter 9 is cylindrically formed of a nonwoven fabric of an organic fiber such as cotton, nylon, "Tetlon", acrylic, or "Pylen", or of an inorganic fiber such as asbestos, glass, or metal, and is pleated to increase the filtration area. Since the filter being used becomes clogged during filtration of powder particles, installed within the filter 9 are the back-washing nozzle 14 for spouting pulse air at regular time intervals to drive out powder particles from the filter, and a venturi 15 for efficient introduction of the air from the back-washing nozzle 14 into the filter; thus making back-washing possilbe.

A shaft 32 is rotatably attched to the lower portion of each guide plate 7 by a rib 36, said shaft 32 having actuator rods 33 and 34 attached thereto. Actuator rod 34 is urged to turn in a clockwise direction by a spring 35, so that an actuator element 36 attached to the front end of the actuator rod 34 is passed through a hole formed in the holder 13 until its front end engages a recess 93 formed in the flange 91 of the filter 9. This prevents accidental dislodging of the filter 9. Further, a packing 94 is disposed between the outer peripheral surface of the flange 91 and the inner peripheral surface of the holder 13 to seal the clearance between the upper and lower chambers 1 and 2.

A rotary guide 22 is disposed in the lower chamber 2 and is held by a central shaft 23 extending through a bottom plate 21 through the intermediary of an arm 24. The central shaft 23 is rotated by a motor 29, whereby the rotary guide 22 is moved to a position below the filter 9 loctaed at any desired position, so that the filter fed thereto is carried to the filter discharge port 17.

Further, a radially extending scraper 28 is fixed on the central shaft 23, whereby powdered particles that have fallen onto the bottom plate 21 are gathered and fed into the filter discharge port 17.

The filter discharge port 17 is sealed by a vinyl bag (not shown) and may have a receiver vessel (not shown) attached to the outer side thereof. In this case, after the filter has been dropped into the vinyl bag, the latter is thermally cut to discard the filter. When it is desired to carry out this operation continuously, the embodiment shown in FIG. 1 may be used. That is, the filter discharge port 17 communicates with a discharge chamber 80 which is laterally formed with a filter removal port 63 and is connected at its lower end to a drive-off chamber 8. The discharge chamber 80 is provided with a floor 82 formed of a perforated plate and with a push-out device 6 at its side, so that the filter that has dropped to the floor 82 is pushed out into the filter take-out port 63 by the rod 61 of the push-out device 6. Disposed within the drive-off chamber 8 is a screw 81 rotated by a motor 88. A vinyl bag 69 can be attached to the filter removal port 63, according to the need. Numeral 27 denotes an maintenance port and 60 denotes a baffle plate for deflecting the flow of air having passed through the inlet port 26.

The operation of the aforesaid apparatus will now be described. When a gas to be treated is fed into the lower chamber 2 through yhe inlet port 26, it passes through the filters 9, whereby dust such as particles of radioactive material is removed from the gas. The gas thus cleaned is fed into upper chamber 1 and taken out through the discharge port. To replace one filter 9 with a new filter, the latter is lowered from above to push the actuator rod 33, thereby rotating the shaft 32 counter-clockwise to relase the actuator element 36 from the recess 93. Further pushing down of the new filter results in the filter 9 being dropped into the rotary guide 22. The new filter is further lowered until it is positioned on the inner peripheral surface of the holder 13, whereupon the actuator rod 34 is pulled by the force of the spring 35 to cause the actuator element 36 to fit in the recess 93, whereby the new filter is held in position.

The filter 9 dropped into the rotary guide 22 is conveyed by the rotation of the central shaft 23 until it is positioned above the filter discharge port 17, whereupon it falls onto the floor 82. Subsequently, the push-out device is actuated and the rod 61 pushes out the filter 9 into the filter removal port 63. The aforesaid operation is performed successively with respect to the four circumferentially arranged filters. The dust driven out by back-washing is continuously fed into the drive-off chamber 8 through the floor 82 and then it is continuously driven off by the screw 81. Thus, even in the case where the amount of dust is very large, there is no problem, and since most of the dust has been removed, the operation of taking out the filter is performed with ease.

If the dust contains radioactive material, to prevent the same escaping, the operation may be performed by the shown in FIGS. 5(a)-(n). First, as shown in FIG. 5(a) and (b), the cover 18 is removed and the filter supply port 5 is covered with a vinyl bag 50. The vinyl bag 50 has a filter 9a placed therein in advance. The vinyl bag has attached thereto a glove 40, by means of which the vinyl bag sealing the filter supply port 5 is removed and put into vinyl bag 50, as shown in FIG. 5(c) and (d). Then, as shown in FIG. 5(e) and (f), the new filter 9a is lowered while dropping the filter 9 into rotary guide 22, and the new filter 9a is set in position.

Subsequently, as shown in FIG. 5(g) and (h), the vinyl bag 50 is thermally cut to enclose the vinyl bag 50 and glove 40, and after removal of the same, the cover 18 is placed in position. Then, the rotary guide 22 is moved to be positioned above the filter discharge port 17. As shown in FIG. 5(i), (j) and (k), the filter 9 dropped onto the floor 82 is pushed out into the filter take-out port 63 by the rod 61, so that the filter 9 is received in the vinyl bag 69 sealing the filter removal port 63, whereupon the vinyl bag 69 is thermally cut. The receiver vessel 25 is carried to a predetermined location and the vinyl bag 69 containing the filter 9 is discarded, whereupon a new vinyl bag 69a is placed on the filter removal port 63 and the cover 62 is placed in position, as shown in FIG. 5(l), (m) and (n). In addition, in this case, the remainder of the vinyl bag 69 left after thermal cutting has been removed and placed into the vinyl bag 69a, but this relation is not illustrated.

In this manner, with the filter supply port 5 and filter removal port 63 sealed by the vinyl bags 18 and 69, respectively, exchange of the filters 9 is effected. Further, during exchange, direct communication between the upper and lower chambers 1 and 2 at the holder 13 is cut off, so that there is no danger of the radioactive materials escaping during exchange of the filters 9 and the exchange operation can be easily carried out. In addition, where the apparatus is used as a common dust collector, the vinyl bags are unnecessary.

As has been described so far, according to this invention, the partition plate dividing the interior of the housing into upper and lower chambers is provided with filter holders so that exchange of filters can be effected while maintaining the housing interior in a sealed state; the dust is continuously taken out and exchange of filters can be effected while preventing dust from flying away.

Obviously, numerous modifications and variations of the present invention are possible in light of the above teachings. It is therefore to be understood that within the scope of the appended claims, the invention may be practiced otherwise than as specifically described herein.

What is claimed is:

1. A dust collector for collecting of radioactive particles, comprising:

a housing;

a first filter positioned in said housing;

a partition plate positioned in said housing and dividing said housing into upper and lower chambers, said upper chamber having a discharge port for a clean gas and a filter supply port formed therein, and said lower chamber having an inlet port for a gas to be cleaned and a filter discharge port formed therein;

filter holder means extending through said partition plate supporting said first filter and enabling a second filter to be automatically installed thereto from above and allowing said first filter to be withdrawn therefrom downwardly and to support said second filter in an operable position;

movable guide means positioned in said lower chamber for receiving said first filter withdrawn from said filter holder means; and means for moving said movable guide means.

2. A dust collector utilizing a filter as set forth in claim 1, further comprising at least one guide plate mounted on said partition plate and through which said first filter is withdrawn.

3. A dust collector utilizing a filter as set forth in claim 1, further comprising scraper means mounted in said lower chamber for gathering powdered particles that have fallen into said lower chamber and for feeding said particles to said filter discharge port.

4. A dust collector as set forth in claim 1, wherein said movable guide means further comprises rotatable guide means.

5. A dust collector utilizing a filter, comprising:
a housing ;
a first filter positioned in said housing;
a partition plate position in said housing and dividing said housing into upper and lower chambers, said upper chamber having a discharge port for a cleaned gas and a filter supply port formed therein, the lower chamber having an inlet port for a gas to be cleaned and a filter discharge port formed therein;
filter holder means extending through said partition plate supporting said first filter and enabling a second filter to be automatically installed thereinto from above and allowing said first filter to be withdrawn downwardly therefrom and to support said second filter in an operable position, said filter discharge port being formed in a lower portion of said lower chamber and said upper chamber having a filter take-out port formed therein;
means operatively positioned and arranged with respect to said housing for continuously discharging collected dust;
movable guide means positioned in said lower chamber for receiving said first filter withdrawn from said filter holder means; and
means for moving said movable guide means.

6. A dust collector utilizing a filter as set forth in claim 5, further comprising at least one guide plate mounted on said partition plate and through which said first filter is withdrawn.

7. A dust collector utilizing a filter as set forth in claim 5, wherein said means for discharging collected dust further comprises scraper means mounted in said lower chamber for gathering powdered particles that have fallen into the lower chamber and feeding said particles to said filter discharge port.

8. A dust collector as set forth in claim 5, wherein said movable guide means further comprises rotatable guide means.

* * * * *